(12) United States Patent
Ezaki

(10) Patent No.: US 8,787,857 B2
(45) Date of Patent: Jul. 22, 2014

(54) RECEIVING APPARATUS, FREQUENCY DEVIATION CALCULATING METHOD, AND MEDIUM STORING COMPUTER PROGRAM THEREIN

(71) Applicant: Fujitsu Limited, Kawasaki (JP)

(72) Inventor: Takato Ezaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/851,762

(22) Filed: Mar. 27, 2013

(65) Prior Publication Data
US 2013/0281038 A1 Oct. 24, 2013

(30) Foreign Application Priority Data
Apr. 20, 2012 (JP) ................................ 2012-097180

(51) Int. Cl.
*H04B 17/00* (2006.01)
*H04B 15/00* (2006.01)

(52) U.S. Cl.
USPC ..................... 455/226.1; 455/67.16; 455/504; 375/226

(58) Field of Classification Search
CPC ............................. H04B 17/004; H04L 1/0009
USPC ............... 455/67.11, 67.16, 226.1, 501, 504; 375/226, 322; 370/343, 436, 480
See application file for complete search history.

(56) References Cited

U.S. PATENT DOCUMENTS

| | | | |
|---|---|---|---|
| 5,001,724 A * | 3/1991 | Birgenheier et al. ...... | 455/226.1 |
| 5,959,965 A * | 9/1999 | Ohkubo et al. ............... | 370/203 |
| 6,687,290 B1 * | 2/2004 | Okazaki ........................ | 375/226 |
| 6,704,552 B1 | 3/2004 | Matsumoto | |
| 7,558,576 B2 * | 7/2009 | Chen et al. .................. | 455/67.16 |
| 2004/0091026 A1 | 5/2004 | Kakayama | |
| 2007/0133611 A1 | 6/2007 | Li et al. | |
| 2009/0067476 A1 | 3/2009 | Kawabata et al. | |
| 2013/0094560 A1 * | 4/2013 | Ezaki et al. .................... | 375/226 |

FOREIGN PATENT DOCUMENTS

| | | |
|---|---|---|
| JP | 2001-86031 A | 3/2001 |
| JP | 2004-153585 A | 5/2004 |
| JP | 2007-515109 A | 6/2007 |
| JP | 2009-65581 A | 3/2009 |
| WO | WO 2010/021041 A1 | 2/2010 |

OTHER PUBLICATIONS

Paul H. Moose: "A Technique for Orthogonal Frequency Division Multiplexing Frequency Offset Correction," IEEE Transactions on Communications, vol. 42, No. 10, Oct. 1994, pp. 2908-2914.
R4-060149, "Discussion on AFC problem under high speed train environment," TSG-RAN Working Group 4 Meeting #38, Denver, USA Feb. 13-17, 2006.

* cited by examiner

*Primary Examiner* — Quochien B Vuong
(74) *Attorney, Agent, or Firm* — Arent Fox LLP

(57) ABSTRACT

A receiving apparatus includes a memory that stores parameters corresponding to lines based on a first time interval and a second time interval in a coordinate space in which first phase rotation in a reception signal is defined as a first axis and second phase rotation in a reception signal is defined as a second axis; a selecting device that selects a line that is closest to a coordinate point in the solution space, the coordinate point being represented by a first observation value of the first phase rotation and a second observation value of the second phase rotation; an acquiring device that acquires the parameters corresponding to the line from the memory; and an estimating device that estimates, based on the parameters, the first observation value, and the first time interval or the parameters, the second observation value, and the second time interval, frequency deviations of the reception signals.

9 Claims, 16 Drawing Sheets

FIG. 3

| I | $k_0$ | $k_1$ |
|---|---|---|
| −5 | $k_0^{(-5)}$ | $k_1^{(-5)}$ |
| −4 | $k_0^{(-4)}$ | $k_1^{(-4)}$ |
| −3 | $k_0^{(-3)}$ | $k_1^{(-3)}$ |
| −2 | $k_0^{(-2)}$ | $k_1^{(-2)}$ |
| −1 | $k_0^{(-1)}$ | $k_1^{(-1)}$ |
| 0 | $k_0^{(0)}$ | $k_1^{(0)}$ |
| 1 | $k_0^{(1)}$ | $k_1^{(1)}$ |
| 2 | $k_0^{(2)}$ | $k_1^{(2)}$ |
| 3 | $k_0^{(3)}$ | $k_1^{(3)}$ |
| 4 | $k_0^{(4)}$ | $k_1^{(4)}$ |
| 5 | $k_0^{(5)}$ | $k_1^{(5)}$ |

| l | k_PUCCH | k_PUSCH |
|---|---|---|
| −5 | −1 | −3 |
| −4 | 0 | −1 |
| −3 | 1 | 2 |
| −2 | 2 | 3 |
| −1 | −1 | −2 |
| 0 | 0 | 0 |
| 1 | 1 | 1 |
| 2 | −2 | −3 |
| 3 | −1 | −1 |
| 4 | 0 | 1 |
| 5 | 1 | 3 |

FIG. 15

| I | k$_{PUCCH}$ | k$_{PUSCH}$ |
|---|---|---|
| −5 | 0 | −1 |
| −4 | 0 | −1 |
| −3 | 1 | 2 |
| −2 | 0 | 0 |
| −1 | 0 | 0 |
| 0 | 0 | 0 |
| 1 | 0 | 0 |
| 2 | 0 | 0 |
| 3 | −1 | −1 |
| 4 | 0 | 1 |
| 5 | 0 | 1 |

27

RECEIVING APPARATUS, FREQUENCY DEVIATION CALCULATING METHOD, AND MEDIUM STORING COMPUTER PROGRAM THEREIN

CROSS-REFERENCE TO RELATED APPLICATION

This application is based upon and claims the benefit of priority from the prior Japanese Patent Application No. 2012-097180 filed on Apr. 20, 2012, the entire contents of which are incorporated herein by reference.

FIELD

The embodiments discussed herein are related to a receiving apparatus, a frequency deviation calculating method, and a medium storing a computer program therein.

BACKGROUND

In the case where no shield exists between a mobile station travelling at high speed and a base station, the propagation environment of radio waves is a so-called Rician fading environment. In this case, it is known that the influence of the Doppler Effect on a reception signal appears as a frequency deviation, which greatly affects the communication quality (see, for example, 3GPP (Third Generation Partnership Project) Contribution, R4-060149, "Discussion on AFC problem under high speed train environment", NTT DoCoMo, USA, Feb. 13-17, 2006). As a method for estimating the frequency of a reception signal, a method for estimating the phase rotation at reception intervals by calculating the correlation between reference signals received at different reception times is known (see, for example, P. Moose, "A Technique for Orthogonal Frequency Division Multiplexing Frequency Offset Correction", IEEE Trans. Commun., vol. 42, no. 10, October. 1994).

Furthermore, a method is known in which in the case where a plurality of temporally separate reference signals are arranged in an information transmission unit received from a mobile station, a base station calculates a phase change on the basis of the plurality of reference signals and calculates a frequency deviation on the basis of the phase change (see, for example, Japanese Laid-open Patent Publication No. 2009-065581). Furthermore, a method for estimating a frequency deviation on the basis of the phase deviation and time interval between a known symbol inserted in a common control channel and a synchronization code is available (see, for example, Japanese Laid-open Patent Publication No. 2007-515109).

Furthermore, a method for calculating a first phase difference on the basis of a phase variation component between a plurality of pilot symbols arranged within one slot, calculating a second phase difference on the basis of a phase variation component between pilot symbol groups in two slots, and detecting a frequency deviation using the first phase difference and the second phase difference is available (see, for example, Japanese Laid-open Patent Publication No. 2004-153585). Furthermore, a method for calculating, for individual channels, estimate values of differences between the frequency of a receiving signal and its own operating frequency on the basis of pilot symbols of a plurality of channels and controlling the operating frequency on the basis of the calculated estimated values is available (see, for example, Japanese Laid-open Patent Publication No. 2001-086031).

A mobile station being traveling receives from a base station a downlink signal including Doppler frequency added thereto as a frequency deviation, and determines the carrier frequency of an uplink signal to the base station on the basis of the carrier frequency of the reception signal. Meanwhile, the base station receives from the mobile station being travelling an uplink signal including Doppler frequency added thereto as a frequency deviation. Thus, the uplink signal received by the base station may have a frequency deviation twice the Doppler frequency.

SUMMARY

In the case where the mobile station travels at high speed, since a large frequency deviation occurs due to the influence of the Doppler Effect, base station equipment estimates a frequency deviation over a wide frequency range. In a known method for estimating a frequency deviation, a special reference signal as well as a normal reference signal is used. The base station equipment estimates a frequency deviation over a wide frequency range on the basis of the normal reference signal and the special reference signal. Thus, the amount of calculation increases, and the throughput is deteriorated.

According to an aspect of the embodiments, a receiving apparatus includes a memory that stores parameters corresponding to equally-spaced parallel lines forming a solution space derived based on a first time interval and a second time interval in a coordinate space in which first phase rotation at the first time interval of a first reference signal included in a reception signal of a first channel is defined as a first axis and second phase rotation at the second time interval of a second reference signal included in a reception signal of a second channel is defined as a second axis; a selecting device that selects a line that is closest to a coordinate point in the solution space, the coordinate point being represented by a first observation value of the first phase rotation and a second observation value of the second phase rotation; an acquiring device that acquires the parameters corresponding to the line selected by the selecting device from the memory; and an estimating device that estimates, based on the parameters acquired by the acquiring device, the first observation value, and the first time interval or the parameters acquired by the acquiring device, the second observation value, and the second time interval, frequency deviations of the reception signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of the correspondence of the number "l" of a line to parameters $k_0$ and $k_1$ in the first embodiment;

FIG. 8 illustrates an example of the correspondence of the number "l" of a straight line to parameters $k_{PUCCH}$ and $k_{PUSCH}$ in the third embodiment;

FIG. 15 illustrates another example of the correspondence of the line "l" of a straight line to parameters $k_{PUCCH}$ and $k_{PUSCH}$ in the third embodiment.

DESCRIPTION OF EMBODIMENTS

Figure 1:
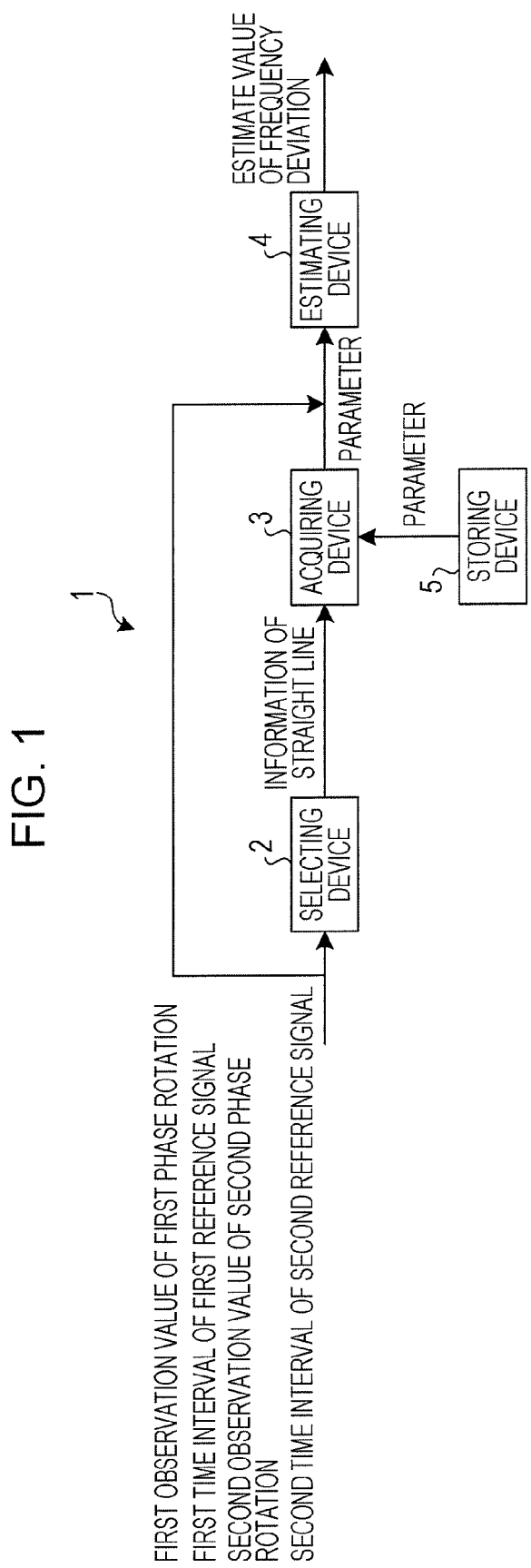
FIG. 1 illustrates an example of a frequency deviation estimation functional block in a receiving apparatus according to a first embodiment.

Hereinafter, receiving apparatuses, frequency deviation calculating methods, and media storing computer programs therein according to preferred embodiments will be illustrated in detail with reference to the attached drawings. In the explanations of the embodiments described below, similar component parts will be referred to with the same reference numerals and signs and redundant explanations will be omitted.

FIG. 1 illustrates an example of a frequency deviation estimation functional block in a receiving apparatus according to a first embodiment. As illustrated in FIG. 1, a receiving apparatus 1 includes a selecting device 2, an acquiring device 3, and an estimating device 4, in the frequency deviation estimation functional block. The receiving apparatus 1 also includes a memory 5.

Regarding a reception signal received by the receiving apparatus 1, a reception signal of a first channel includes a first reference signal, and a reception signal of a second channel includes a second reference signal. In an ideal environment without noise, the phase rotation of the first reference signal at a first time interval $T_0$ is defined as a first phase rotation $\theta_0$. Similarly, in an ideal environment without noise, the phase rotation of the second reference signal at a second time interval $T_1$ is defined as a second phase rotation $\theta_1$.

The reception signal of the first channel and the reception signal of the second channel are signals transmitted from the same wireless communication apparatus, with which the receiving apparatus 1 communicates. Thus, the frequency deviation of the first reference signal and the frequency deviation of the second reference signal in unit time are the same. When $\Delta f$ represents the frequency deviation of each of the first reference signal and the second reference signal in unit time, the first phase rotation $\theta_0$ and the second phase rotation $\theta_1$ in an ideal environment without noise are expressed by equations (1) and (2), respectively. In addition, when $\Delta f$ is removed from equation (1) and (2), equation (3) is derived.

$$\theta_0 = 2\pi T_0 \Delta f \quad (1)$$

$$\theta_1 = 2\pi T_1 \Delta f \quad (2)$$

$$\frac{\theta_0}{T_0} = \frac{\theta_1}{T_1} \quad (3)$$

In equation (3), "T0" and "T1" represent the time interval of first reference signals and the time interval of second reference signals, respectively, and are constants determined in advance for individual channels. Thus, $\theta 0$ and $\theta 1$ have a first-order relationship. Here, since $\theta 0$ and $\theta 1$ represent phases, $\theta 0$ and $\theta 1$ are represented by equation (4) and equation (5), respectively, using any integers k0 and k1.

$$\theta_0 = \theta_0 + 2\pi k_0 (-\pi \leq \theta_0 \leq \pi) \quad (4)$$

$$\theta_1 = \theta_1 + 2\pi k_1 (-\pi \leq \theta_1 \leq \pi) \quad (5)$$

When equation (4) and equation (5) are substituted into equation (3), equation (6) is obtained. As is clear from equation (6), in an area $-\pi \leq \theta_0, \theta_1 < \pi$ in a coordinate space in which $\theta_0$ represents a horizontal axis and $\theta_1$ represents a vertical axis, the relationship between $\theta_0$ and $\theta_1$ is expressed by a plurality of equally-spaced parallel straight lines. The number of straight lines and the space between the straight lines appearing in the coordinate space are determined on the basis of $T_0$ and $T_1$.

$$\frac{\theta_0 + 2\pi k_0}{T_0} = \frac{\theta_1 + 2\pi k_1}{T_1} \quad (6)$$

That is, a plurality of equally-spaced parallel straight lines expressed by equation (6) represent a solution space that satisfies possible combinations of $\theta 0$ and $\theta 1$. The solution of a combination of $\theta 0$ and $\theta 1$ exists at a point in the plurality of straight lines in the solution space.

Figure 2:
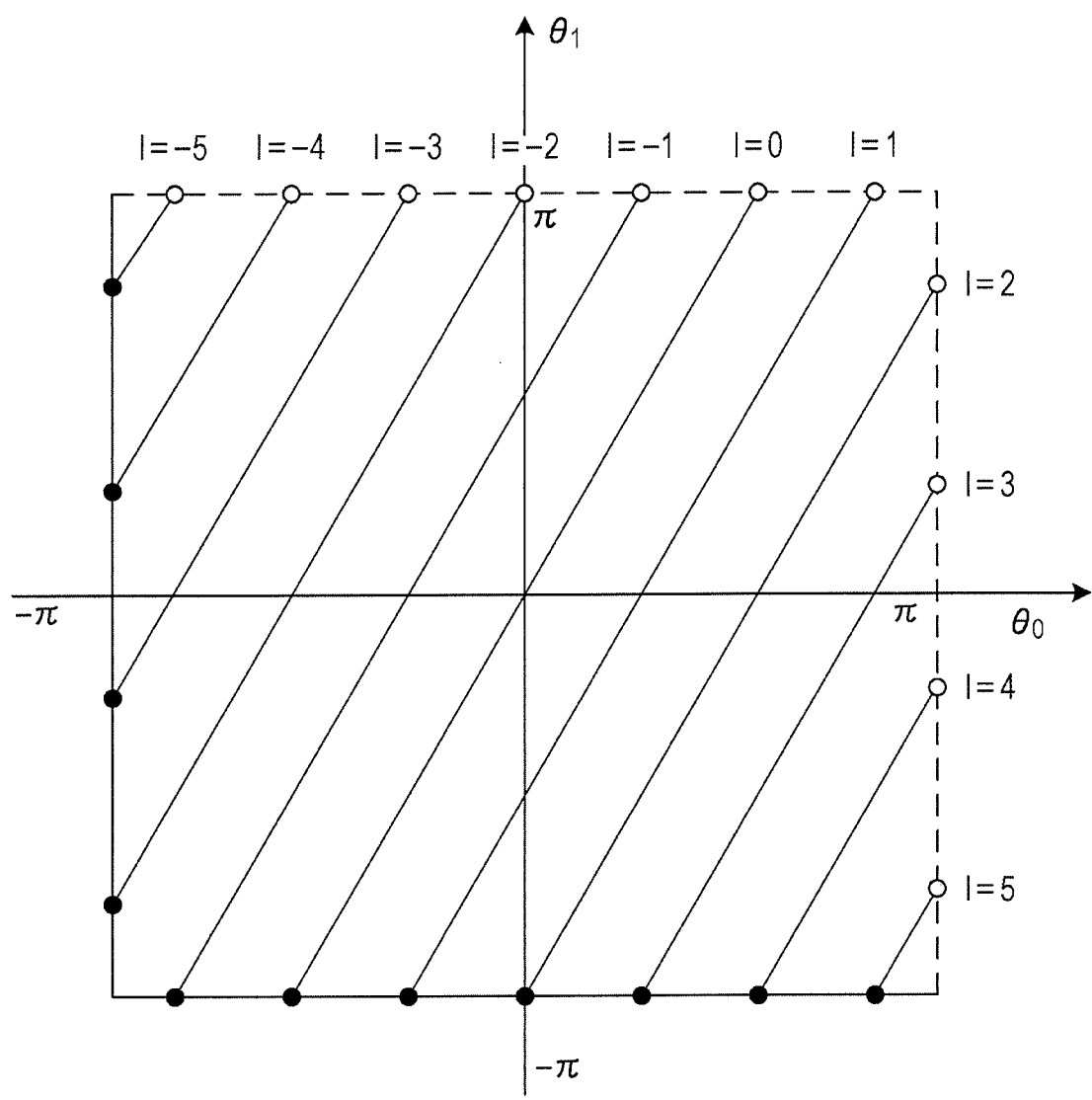
FIG. 2 illustrates an example of a solution space representing combinations of $\theta_0$ and $\theta_1$ in the first embodiment.

FIG. 2 illustrates an example of the solution space of combinations of $\theta_0$ and $\theta_1$ in the first embodiment. In the example illustrated in FIG. 2, the number of straight lines in the solution space is not particularly limited. However, for example, eleven straight lines exist in the solution space. For example, the number "l" of the straight line that intersects the $\theta_0$ axis at the origin of the coordinate axes may be defined as "0". The numbers "l" of the straight lines that intersect the $\theta_0$ axis at points closer to a $\pi$ side than the origin may be defined as increasing numbers, such as 1, 2, 3, etc. in order of proximity to the origin. The numbers "l" of the straight lines that intersect the $\theta_0$ axis at points closer to a $-\pi$ side than the origin may be defined as decreasing numbers, such as $-1$, $-2$, $-3$, etc. in order of proximity of the origin.

FIG. 3 illustrates an example of correspondence of the number "l" of a straight line to the parameters $k_0$ and $k_1$ in the first embodiment. In a table 11 illustrated in FIG. 3, the values of the parameters $k_0$ and $k_1$ corresponding to the value of "l" are set in advance by a designer of the receiving apparatus 1, for example.

In the receiving apparatus 1 illustrated in FIG. 1, the memory 5 stores parameters corresponding to individual straight lines in a solution space. The memory 5 may store, for example, the table 11 illustrated in FIG. 3 as parameters corresponding to individual straight lines in a solution space.

In the case where a reception signal is affected by noise, the phase rotation at the first time interval $T_0$ of the first reference signal, which is actually observed by the receiving apparatus

1, is shifted from the first phase rotation $\theta_0$ in an ideal environment without noise. The observation value of the phase rotation at the first time interval $T_0$ of the first reference signal is defined as a first observation value $\phi_0$. The range of the first observation value $\phi_0$ is represented by "$-\pi \leq \phi_0 < \pi$".

In the case where a reception signal is affected by noise, the phase rotation at the second time interval $T_1$ of the second reference signal, which is actually observed by the receiving apparatus 1, is shifted from the second phase rotation $\theta_1$ in an ideal environment without noise. The observation value of the phase rotation at the second time interval $T_1$ of the second reference signal is defined as a second observation value $\phi_1$. The range of the second observation value $\phi_1$ is represented by "$-\pi \leq \phi_1 < \pi$".

Here, integers $S_0$ and $S_1$ that satisfy the relationship "$S_0$:$S_1 = T_0$:$T_1$" and that are relatively prime are defined. The values of $S_0$ and $S_1$ are uniquely defined according to the values of $T_0$ and $T_1$. Hereinafter, in the explanation regarding straight lines, $S_0$ and $S_1$ are used instead of $T_0$ and $T_1$.

With the use of $S_0$ and $S_1$, equation (6) is expressed by equation (7). Even when equation (6) is replaced using $S_0$ and $S_1$ instead of $T_0$ and $T_1$, straight lines totally the same as those in the case where $T_0$ and $T_1$ are used are expressed. Here, the number N (l) of straight lines forming a solution space is expressed by equation (8) utilizing a ceiling function. See Wikipedia (URL http://en.wikipedia.org/wiki/Floor_and_ceiling_functions) for the floor and ceiling functions.

$$\frac{\theta_0 + 2\pi k_0}{S_0} = \frac{\theta_1 + 2\pi k_1}{S_1} \tag{7}$$

$$N(1) = \left\lceil \frac{S_0 + S_1}{2} \right\rceil \times 2 - 1 \tag{8}$$

Figure 4:
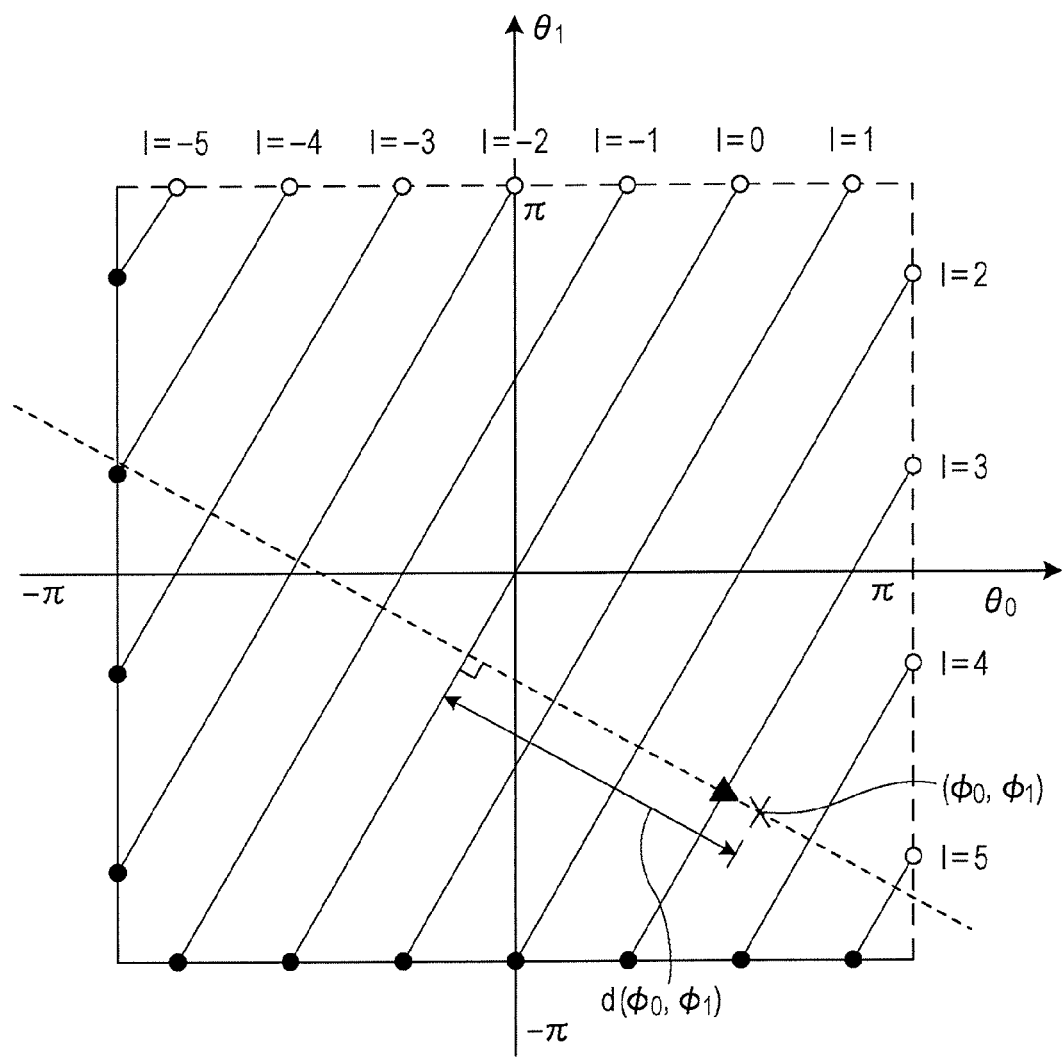
FIG. 4 illustrates processing for selecting a straight line in the first embodiment.

FIG. 4 is a diagram for illustrating processing for selecting a straight line in the first embodiment. In FIG. 4, mark "x" represents a coordinate point represented by the first observation value φ0 of the phase rotation at the first time interval T0 of the first reference signal and the second observation value φ1 of the phase rotation at the second time interval T1 of the second reference signal, which are actually observed by the receiving apparatus 1. The distance d (φ0, φ1) between the coordinate point (φ, φ1) marked with "x" and a straight line passing through the origin in the solution space, that is, a straight line whose straight line number "l" is "0" is expressed by equation (9).

$$d(\phi_0, \phi_1) = \frac{S_0\phi_1 + S_1\phi_0}{\sqrt{S_0^2 + S_1^2}} \tag{9}$$

The space D between straight lines in a solution space is expressed by equation (10). The straight line that is the closest to the coordinate point (φ0, φ1) may be selected by dividing the distance d (φ0, φ1) between the coordinate point (φ0, φ1) and the straight line whose straight line number "l" is "0" by the space D between the straight lines. Thus, the number "l" of the straight line that is the closest to the coordinate point (φ0, φ1) is obtained by equation (11) utilizing floor functions.

$$D = \frac{2\pi}{\sqrt{S_0^2 + S_1^2}} \tag{10}$$

$$1 = \left\lfloor \frac{d(\phi_0, \phi_1)}{D} + 0.5 \right\rfloor = \left\lfloor \frac{S_0\phi_1 - S_1\phi_0}{2\pi} + 0.5 \right\rfloor \tag{11}$$

In the receiving apparatus 1 illustrated in FIG. 1, the selecting device 2 selects the straight line that is the closest to the coordinate point represented by the first observation value φ0 and the second observation value φ1 in the solution space. The selecting device 2 may obtain the number "l" of the straight line that is the closest to the coordinate point (φ0, φ1) by calculation using, for example, equation (12) utilizing a floor function as processing for selecting a straight line. Then, the selecting device 2 may output, for example, the number "l" of the straight line, as information of the selected straight line, to the acquiring device 3 of the receiving apparatus 1 illustrated in FIG. 1.

$$1 = \left\lfloor \frac{S_0\phi_1 - S_1\phi_0}{2\pi} + 0.5 \right\rfloor \tag{12}$$

In the receiving apparatus 1 illustrated in FIG. 1, the acquiring device 3 acquires from the memory 5 parameters corresponding to a straight line selected by the selecting device 2. The acquiring device 3 may receive, for example, the number "l" of a straight line from the selecting device 2, and acquire parameters k0(l) and k1(l) corresponding to the straight line of the number "l" by referring to, for example, the table 11 illustrated in FIG. 3.

In the case where a sufficient signal-to-noise ratio (SNR) is ensured, the influence of noise may be regarded as being small. In such a case, the phase rotation at the first time interval $T_0$ of the first reference signal, that is, the first phase rotation $\theta_0$ may be calculated by using the first observation value $\phi_0$ without correcting the influence of noise. In this case, $\theta_0$ is expressed by equation (13) using a parameter $k_0^{(l)}$ corresponding to a straight line having the number "l".

$$\theta_0 = \phi_0 + 2\pi k_0^{(l)} \tag{13}$$

Similarly, the phase rotation at the second time interval T1 of the second reference signal, that is, the second phase rotation θ1 may be calculated by using the second observation value θ1 without correcting the influence of noise. In this case, θ1 is expressed by equation (14) using a parameter k1(l) corresponding to a straight line having the number "l".

$$\theta_1 = \phi_1 + 2\pi k_1^{(l)} \tag{14}$$

The frequency deviation Δf0 of the first reference signal is expressed by equation (15). The frequency deviation Δf1 of the second reference signal is expressed by equation (16).

$$\Delta f_0 = \frac{\theta_0}{2\pi T_0} \tag{15}$$

$$\Delta f_1 = \frac{\theta_1}{2\pi T_1} \tag{16}$$

In the receiving apparatus 1 illustrated in FIG. 1, the estimating device 4 estimates the frequency deviation $\Delta f_0$ of a reception signal of the first channel on the basis of the parameter $k_0^{(l)}$ acquired by the acquiring device 3, the first observation value $\phi_0$, and the first time interval $T_0$. Furthermore, the estimating device 4 estimates the frequency deviation $\Delta f_1$ of a reception signal of the second channel on the basis of the parameter $k_1^{(l)}$ acquired by the acquiring device 3, the second observation value $\phi_1$, and the second time interval $T_1$. The estimating device 4 may estimate the frequency deviations $\Delta f_0$ and $\Delta f_1$ by calculation, for example, using equation (15) and (16), as processing for estimating the frequency deviation of a reception signal.

The selecting device 2, the acquiring device 3, and the estimating device 4 in the receiving apparatus 1 may be implemented when a processor executes a computer program implementing a frequency deviation calculating method, which will be described later. Alternatively, the selecting device 2 and the estimating device 4 may be implemented by hardware such as a circuit that performs arithmetic operation.

Figure 5:
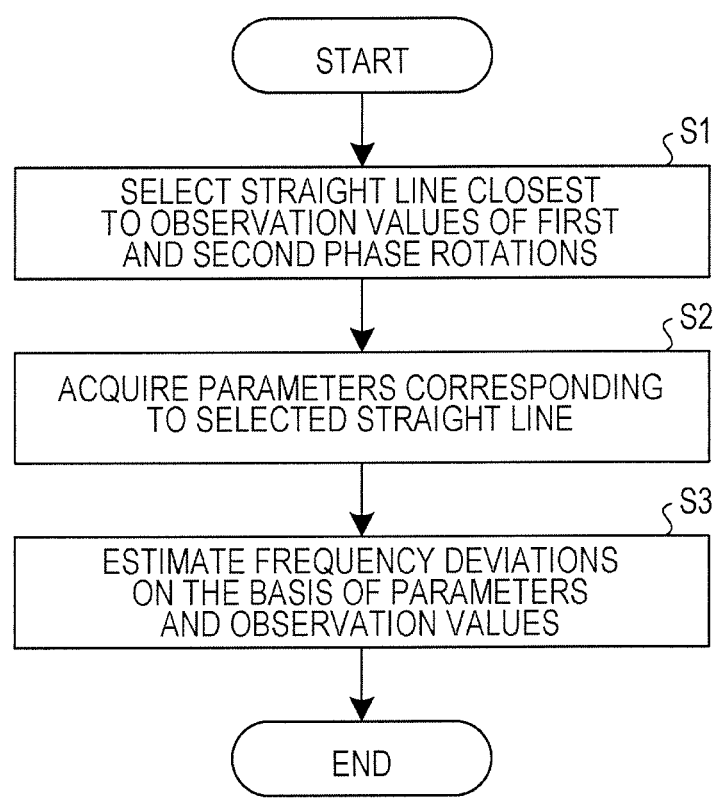
FIG. 5 illustrates an example of a frequency deviation calculating method according to the first embodiment.

FIG. 5 illustrates an example of a frequency deviation calculating method according to the first embodiment. As illustrated in FIG. 5, when frequency deviation calculating processing starts in the receiving apparatus 1, the selecting device 2 selects the straight line that is the closest to the coordinate point represented by the first observation value $\phi_0$ at the first phase rotation $\theta_0$ and the second observation value $\phi_1$ at the second phase rotation $\theta_1$ (operation 1). Then, the acquiring device 3 acquires from the memory 5 the parameters $k_0^{(l)}$ and $k_1^{(l)}$ corresponding to the straight line selected by the selecting device 2 (operation 2).

Then, the estimating device 4 estimates the frequency deviation $\Delta f_0$ of a reception signal of the first channel on the basis of the parameter $k_0^{(l)}$ acquired by the acquiring device 3, the first observation value $\phi_0$, and the first time interval $T_0$. Furthermore, the estimating device 4 estimates the frequency deviation $\Delta f_1$ of a reception signal of the second channel on the basis of the parameter $k_1^{(l)}$ acquired by the acquiring device 3, the second observation value $\phi_1$, and the second time interval $T_1$ (operation 3). Then, a series of frequency deviation calculating processing operations are terminated.

According to the first embodiment, the straight line that is the closest to the coordinate point represented by the observation values $\phi_0$ and $\phi_1$ of the phase rotation of two reference signals of different signal intervals is selected, and parameters $k_0^{(l)}$ and $k_1^{(l)}$ corresponding to the straight line are selected. Thus, over a wide range between $-\pi$ and $\pi$, approximate phase rotations $\theta_0$ and $\theta_1$ at the time intervals $T_0$ and $T_1$ of individual reference signals are obtained. Then, on the basis of the approximate phase rotations $\theta_0$ and $\theta_1$ of the individual reference signals and the time intervals $T_0$ and $T_1$, the frequency deviations $\Delta f_0$ and $\Delta f_1$ of the individual reference signals are estimated. Thus, deterioration in the throughput in estimation of the frequency deviation of a reception signal is avoided.

In a second embodiment, orthogonal projection is performed with respect to the straight line that is the closest to a coordinate point represented by observation values $\phi_0$ and $\phi_1$ of two reference signals from the coordinate point in the first embodiment. Explanation of portions overlapping the first embodiment will be omitted.

Processing to selection of the straight line that is the closest to the coordinate point $(\phi_0, \phi_1)$ is performed similarly to the first embodiment. The number "l" of the straight line that is the closest to the coordinate point $(\phi_0, \phi_1)$ is expressed by equation (11). The straight line having the number "l" is expressed by equation (17) using the parameters $k_0^{(l)}$ and $k_1^{(l)}$.

$$S_1\phi_0 - S_0\phi_1 + 2\pi(S_1 k_0^{(l)} - S_0 k_1^{(l)}) = 0 \quad (17)$$

As described above, the coordinate point determined on the basis of the first observation value $\phi_0$ and the second observation value $\phi_1$ is shifted from the true first phase rotation $\theta_0$ and the true second phase rotation $\theta_1$, for example, due to the influence of noise. It is considered that the point determined on the basis of the true first phase rotation $\theta_0$ and the true second phase rotation $\theta_1$ exists on the straight line having the number "l" that is the closest to the coordinate point $(\phi_0, \phi_1)$ and is the point (represented by a black triangle mark in FIG. 4) that is the closest to the coordinate point $(\phi_0, \phi_1)$.

The point on the straight line having the number "l" that allows the distance between the coordinate point $(\phi_0, \phi_1)$ and the straight line having the number "l" to be minimum is obtained by performing orthogonal projection with respect to the straight line having the number "l" from the coordinate point $(\phi_0, \phi_1)$. By orthogonal projection, the true first phase rotation $\theta_0$ is expressed by equation (18). The true second phase rotation $\theta_1$ is expressed by equation (19). Finally, the frequency deviation $\Delta f$ of a reception signal is expressed by equation (20).

$$\theta_0 = \frac{S_0^2 \phi_0 - S_0 S_1 \phi_1 - 2\pi S_1 (S_1 k_0^{(1)} - S_0 k_1^{(1)})}{S_0^2 + S_1^2} \quad (18)$$

$$\theta_1 = \frac{S_1^2 \phi_1 - S_0 S_1 \phi_0 - 2\pi S_0 (S_1 k_0^{(1)} - S_0 k_1^{(1)})}{S_0^2 + S_1^2} \quad (19)$$

$$\Delta f = \frac{\theta_0}{2\pi T_0} = \frac{\theta_1}{2\pi T_1} \quad (20)$$

In the second embodiment, in the receiving apparatus 1 illustrated in FIG. 1, by performing orthogonal projection with respect to a straight line selected by the selecting device 2 from the coordinate point $(\phi_0, \phi_1)$ of observation values, the true first phase rotation $\theta_0$ or the true second phase rotation $\theta_1$ is estimated. Then, the frequency deviation $\Delta f$ of a reception signal is estimated on the basis of the parameters $k_0^{(l)}$ and $k_1^{(l)}$ acquired by the acquiring device 3, the first and second observation values $\phi_0$ and $\phi_1$, $S_0$ and $S_1$, and the first time interval $T_0$ or the second time interval $T_1$.

The estimating device 4 may estimate the true first phase rotation $\theta_0$ or the true second phase rotation $\theta_1$ by calculation, for example, using equation (18) or (19) as processing for estimating the frequency deviation of a reception signal. Then, the estimating device 4 may estimate the frequency deviation $\Delta f$ by calculating, for example, the middle term or the rightmost term of equation (20) using the estimated true first phase rotation $\theta_0$ or the true second phase rotation $\theta_1$.

According to the second embodiment, the straight line that is the closest to the coordinate point represented by observation values $\phi_0$ and $\phi_1$ of the phase rotation of two reference signals of different signal intervals is selected, and parameters $k_0^{(l)}$ and $k_1^{(l)}$ corresponding to the selected straight line are selected. By orthogonal projection with respect to the straight line from the coordinate point $(\phi_0, \phi_1)$, the true first phase rotation $\theta_0$ or the true second phase rotation $\theta_1$ at the time intervals $T_0$ and $T_1$ of individual reference signals may be estimated over a wide range between $-\pi$ and $\pi$. Then, the frequency deviation $\Delta f$ of a reception signal may be estimated on the basis of one of the estimate values $\theta_0$ and $\theta_1$ of the true phase rotation of the reference signals and the time interval $T_0$ or $T_1$. Thus, deterioration in the throughput in estimation of the frequency deviation of a reception signal is avoided.

In a third embodiment, the receiving apparatus according to the second embodiment is applied to, for example, base station equipment in a long term evolution (LTE) system. An example in which a first channel is defined as a physical up link control channel (PUCCH), which is an uplink control signal, and a second channel is defined as a physical uplink shared channel (PUSCH), which is an uplink data signal, will be illustrated. Explanation of portions overlapping the first embodiment or the second embodiment will be omitted.

The time interval of a PUCCH reference signal is 285.417 microseconds. Thus, a possible estimate frequency deviation ranges between about −1751 Hz and about 1751 Hz. The time interval of a PUSCH reference signal is 500 microseconds. Thus, a possible estimate frequency deviation ranges between about −1000 Hz and about 1000 Hz.

Figure 6:
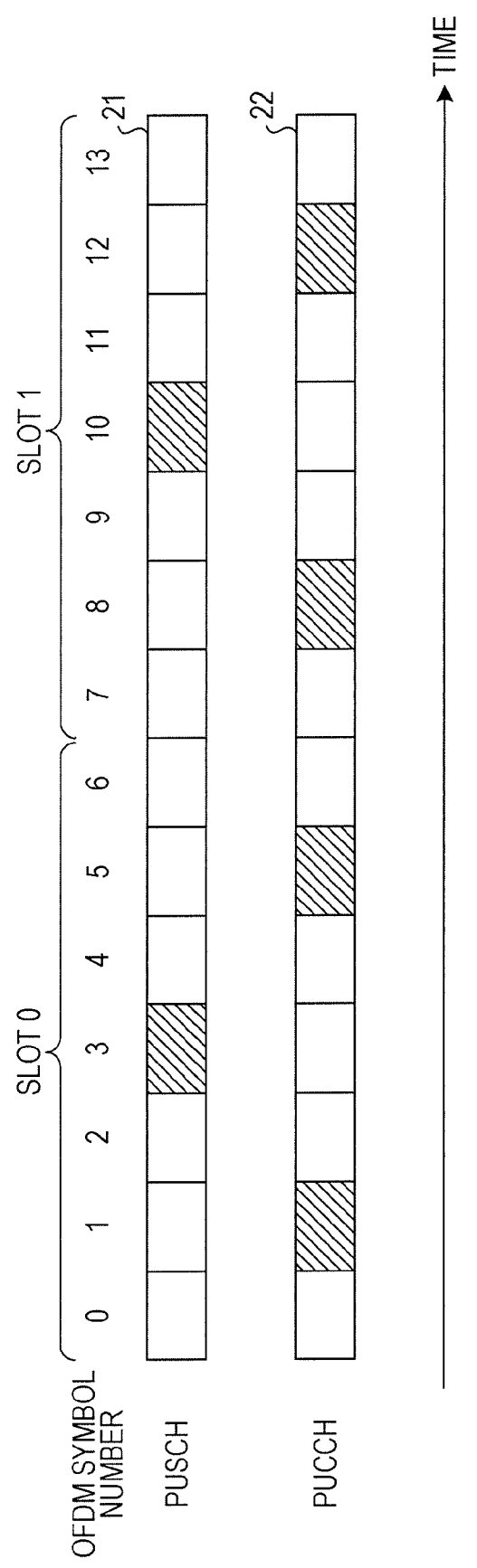
FIG. 6 schematically illustrates the sub-frame format of each of a PUSCH and a PUCCH.

FIG. 6 schematically illustrates the sub-frame format of each of a PUSCH and a PUCCH. In FIG. 6, pilot symbols with hatching represent reference signals. In LTE, individual channels are allocated for 1 millisecond. A time unit of 1 millisecond represents a sub-frame. Sub-frames each include fourteen orthogonal frequency division multiplexing (OFDM) symbols divided into a slot 0 and a slot 1. In a PUSCH sub-frame 21, pilot symbols are allocated to a symbol "3" and a symbol "10". In a PUCCH sub-frame 22, pilot symbols are allocated to a symbol "1", a symbol "5", a symbol "8", and a symbol "12".

In the third embodiment, $\theta_0$, $T_0$, $S_0$, $\phi_0$, and $K_0$ are defined as $\theta_{PUCCH}$, $T_{PUCCH}$, $S_{PUCCH}$, $\phi_{PUCCH}$, and $k_{PUCCH}$, respectively. Similarly, $\theta_1$, $T_1$, $S_1$, $\phi_1$, and $K_1$ are defined as $\theta_{PUSCH}$, $T_{PUSCH}$, $S_{PUSCH}$, $\phi_{PUSCH}$, and $k_{PUSCH}$, respectively.

The time interval $T_{PUCCH}$ of a PUCCH reference signal is 285.417 microseconds, and the time interval $T_{PUSCH}$ of a PUSCH reference signal is 500 microseconds. Thus, integers $S_{PUCCH}$ and $S_{PUSCH}$ that satisfy the relationship "$S_{PUCCH} \cdot S_{PUSCH} = T_{PUCCH} \cdot T_{PUSCH}$" and that are relatively prime are 137 and 240, respectively.

Here, although not particularly limited, calculation is made easier, for example, by approximating $S_{PUCCH}$ to 4 and approximating $S_{PUSCH}$ to 7. Even with such approximations, the ratio of $S_{PUCCH}$ to $S_{PUSCH}$ is "4/7=0.5708", which is nearly the same as "137/240=0.5714". Thus, such approximations do not have a great effect on calculation of frequency deviation. It is obvious that approximation may not be performed.

Figure 7:
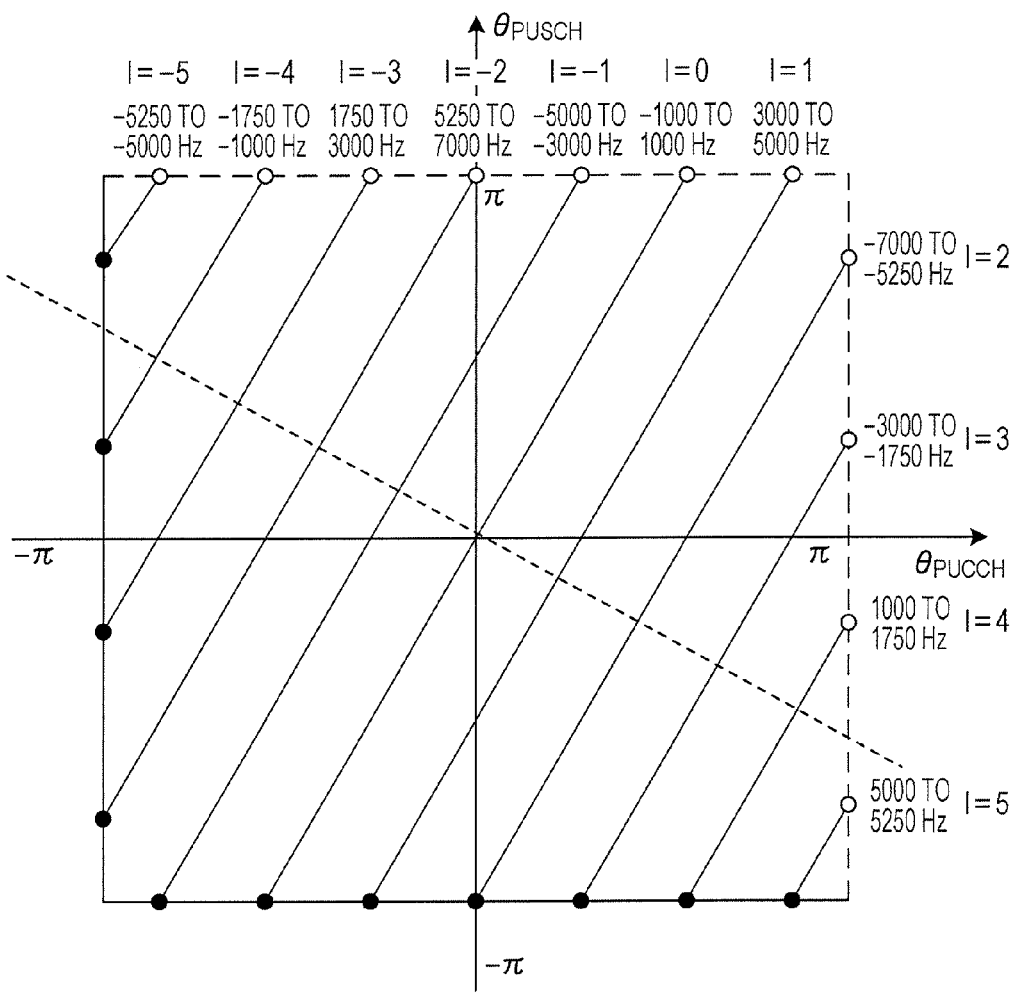
FIG. 7 illustrates an example of a solution space representing combinations of $\theta_{PUCCH}$ and $\theta_{PUSCH}$ in a third embodiment.

FIG. 7 illustrates an example of a solution space representing combinations of $\theta_{PUCCH}$ and $\theta_{PUSCH}$ in the third embodiment. In the example illustrated in FIG. 7, as is clear from equation (8), eleven straight lines exist in the solution space.

When numbers "l" are allocated to the individual straight lines as in the second embodiment, the straight line whose number "l" is "0" corresponds to a frequency deviation ranging between −1000 Hz and 1000 Hz. The straight lines whose numbers "l" are "1" and "−1" correspond to a frequency deviation ranging between 3000 Hz and 5000 Hz and a frequency deviation ranging between −5000 Hz and −3000 Hz", respectively. The straight lines whose numbers "l" are "2" and "−2" correspond to a frequency deviation ranging between −7000 Hz and −5250 Hz and a frequency deviation ranging between 5250 Hz and 7000 Hz, respectively. The straight lines whose numbers "l" are "3" and "−3" correspond to a frequency deviation ranging between −3000 Hz and −1750 Hz and a frequency deviation ranging between 1750 Hz and 3000 Hz, respectively. The straight lines whose numbers "l" are "4" and "−4" correspond to a frequency deviation ranging between 1000 Hz and 1750 Hz and a frequency deviation ranging between −1750 Hz and −1000 Hz, respectively. The straight lines whose numbers "l" are "5" and "−5" correspond to a frequency deviation ranging between 5000 Hz and 5250 Hz and a frequency deviation ranging between −5250 Hz and −5000 Hz, respectively.

FIG. 8 illustrates an example of the correspondence of the number "l" of a straight line to parameters $k_{PUCCH}$ and $k_{PUSCH}$ in the third embodiment. In a table 26 illustrated in FIG. 8, the values of the parameters $k_{PUCCH}$ and $k_{PUSCH}$ corresponding to the values of "l" are set, for example, by a designer of a receiving apparatus.

Figure 9:
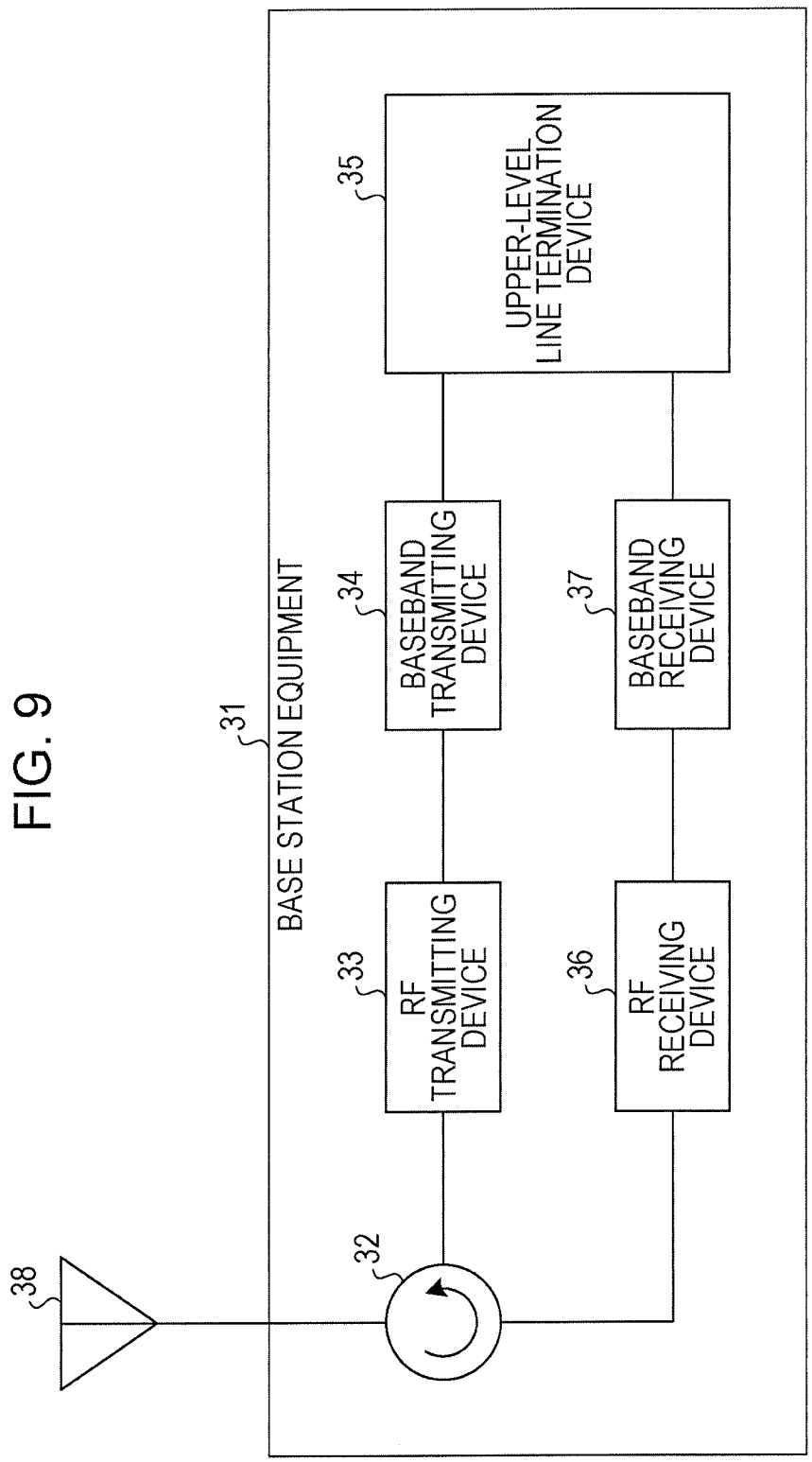
FIG. 9 illustrates an example of the hardware configuration of base station equipment including the receiving apparatus according to the third embodiment.

FIG. 9 illustrates an example of the hardware configuration of base station equipment including the receiving apparatus according to the third embodiment. As illustrated in FIG. 9, base station equipment 31 may include, for example, a duplexer 32, a radio frequency (RF) transmitting device 33, a baseband transmitting device 34, an upper-level line termination device 35, an RF receiving device 36, and a baseband receiving device 37.

The duplexer 32 is connected to an antenna 38. The duplexer 32 allows a transmission path of a transmission signal to be electrically isolated from a transmission path of a reception signal in the base station equipment 31. The RF receiving device 36 is connected to the duplexer 32. The RF receiving device 36 removes carrier waves from an uplink reception signal received via the duplexer 32 from the antenna 38, performs analog-to-digital conversion processing, and generates a reception signal from which the carrier waves have been removed.

The baseband receiving device 37 is connected to the RF receiving device 36. The baseband receiving device 37 performs demodulation processing and decoding processing for an uplink baseband signal output from the RF receiving device 36 to recover a reception signal. In recovery of a reception signal, the baseband receiving device 37 performs processing for calculating a frequency deviation, which will be described later. The upper-level line termination device 35 is connected to the baseband receiving device 37. The upper-level line termination device 35 transmits an output signal of the baseband receiving device 37 to an upper-level network.

The upper-level line termination device 35 receives a signal from the upper-level network. The baseband transmitting device 34 is connected to the upper-level line termination device 35. The baseband transmitting device 34 performs encoding processing and baseband modulation processing for an output signal of the upper-level line termination device 35 to generate a downlink baseband signal.

The RF transmitting device 33 is connected to the baseband transmitting device 34 and the duplexer 32. The RF transmitting device 33 performs digital-to-analog conversion processing and carrier wave modulation processing for an output signal of the baseband transmitting device 34 to generate a downlink modulation signal. The downlink modulation signal is output from the RF transmitting device 33, and is emitted via the duplexer 32 from the antenna 38. Individual antennas may be provided on the transmission side and the receiving side. In this case, the duplexer 32 may not be provided.

Figure 10:
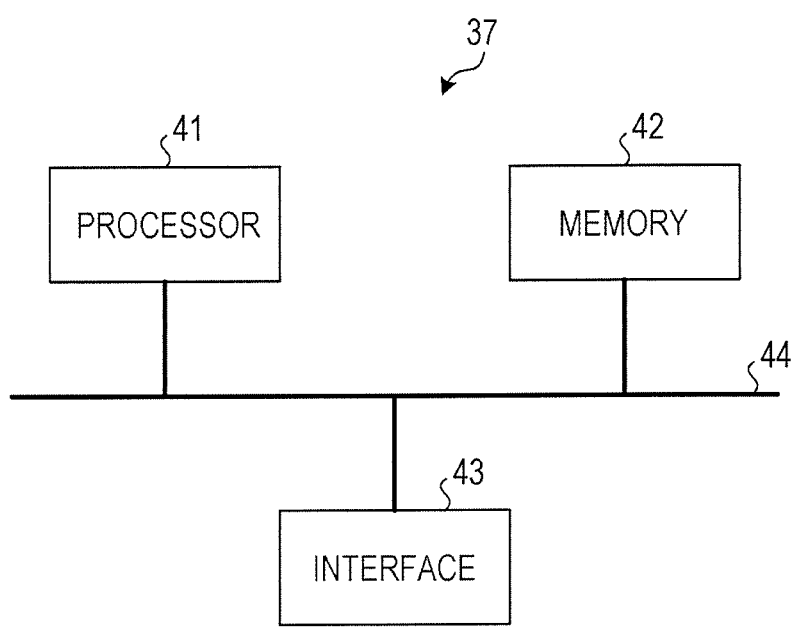
FIG. 10 illustrates an example of the hardware configuration of a baseband receiving device illustrated in FIG. 9.

FIG. 10 illustrates an example of the hardware configuration of the baseband receiving device 37 illustrated in FIG. 9. As illustrated in FIG. 10, the baseband receiving device 37 may include, for example, a processor 41, a memory 42, and an interface 43. The processor 41, the memory 42, and the interface 43 may be connected to a bus 44, for example.

The processor 41 may be, for example, a central processing unit (CPU) or a digital signal processor (DSP). Alternatively, the processor 41 may be, for example, an application specific integrated circuit (ASIC), a field programmable gate array (FPGA), or the like. The memory 42 may store, for example, a computer program implementing a frequency deviation calculating method, which will be described later. The memory 42 also may store the table 26 illustrated in FIG. 8, while serving as a memory of the receiving apparatus 1 illustrated in FIG. 1. The processor 41 may implement the frequency deviation calculating method, which will be described later, by reading the computer program from the memory 42 and executing the read computer program. The interface 43 may be connected to the upper-level line termination device 35 or the RF receiving device 36, for example.

Figure 11:
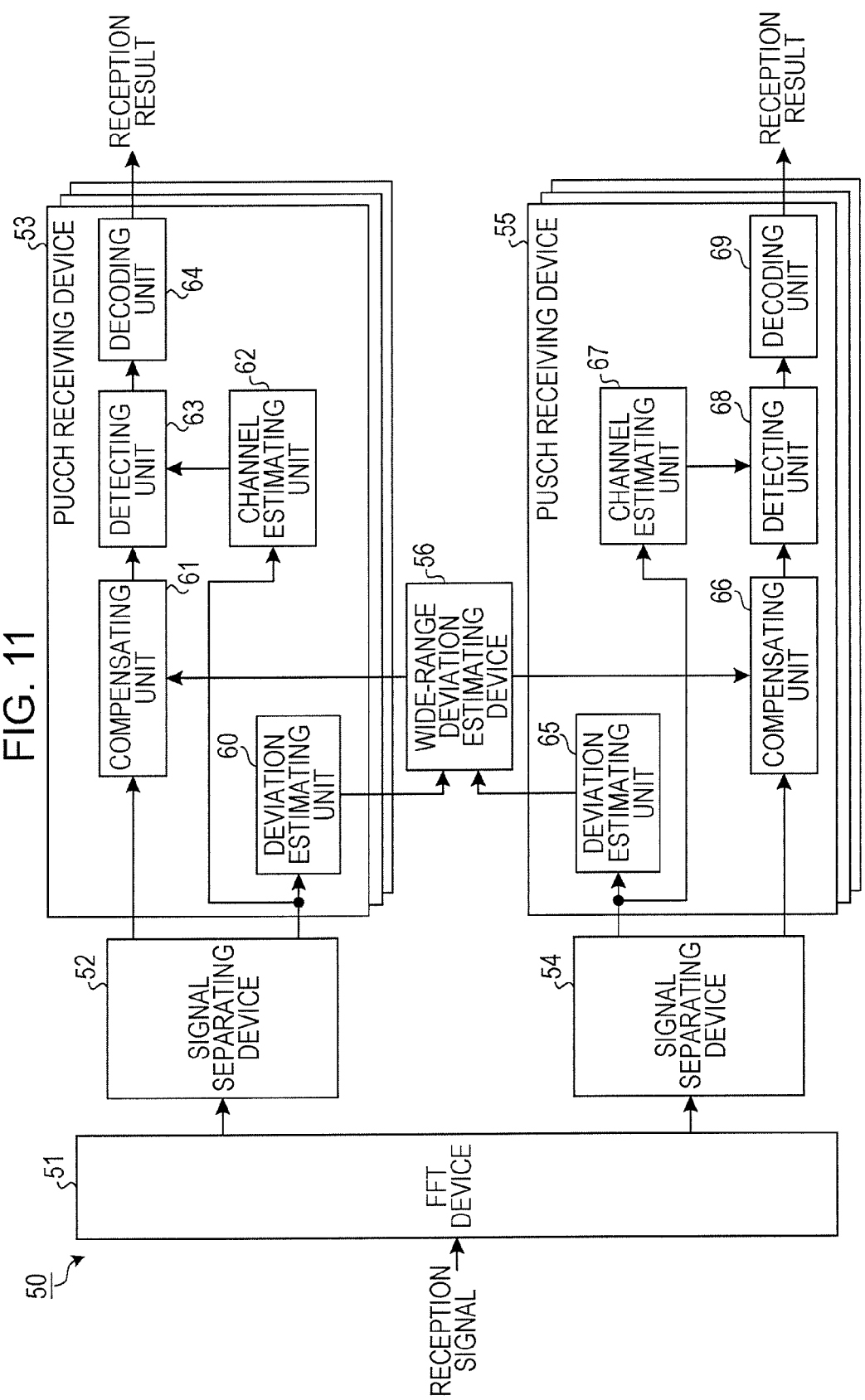
FIG. 11 illustrates an example of the functional configuration of a receiving circuit in the receiving apparatus according to the third embodiment.

FIG. 11 illustrates an example of the functional configuration of a receiving circuit of the receiving apparatus according to the third embodiment. FIG. 11 mainly illustrates functions relating to the explanation provided below. A receiving circuit 50 may include component parts other than the component parts illustrated in FIG. 11. Signal processing performed by the receiving circuit 50 may be performed when the processor 41 of the baseband receiving device 37 executes the computer program stored in the memory 42.

The receiving circuit 50 includes a fast Fourier transform (FFT) device 51, signal separating devices 52 and 54, a PUCCH receiving device 53, a PUSCH receiving device 55, and a wide-range deviation estimating device 56. The FFT device 51 converts an uplink baseband signal received from the RF receiving device 36 into a frequency range signal by fast Fourier transform. The FFT device 51 separates a frequency range signal for individual channels. The FFT device 51 inputs a PUCCH signal to the signal separating device 52, and inputs a PUSCH signal to the signal separating device 54.

The signal separating device 52 separates PUCCH signals for individual users. The signal separating device 52 also separates a signal of a user into data and a reference signal. The signal separating device 52 outputs separated signals to the PUCCH receiving device 53. Similarly, the signal separating device 54 separates PUSCH signals for individual users. The signal separating device 54 also separates a signal of a user into data and a reference signal. The signal separating device 54 outputs separated signals to the PUSCH receiving device 55. The signal processing by the signal separating device 52 and the signal separating device 54 may be performed in the same circuit by time-sharing processing. The signal processing by the PUCCH receiving device 53 and the PUSCH receiving device 55 may also be performed in the same circuit by time-sharing processing.

The PUCCH receiving device 53 includes a deviation estimating unit 60, a compensating unit 61, a channel estimating unit 62, a detecting unit 63, and a decoding unit 64. The deviation estimating unit 60 estimates the phase deviation of a PUCCH reference signal at the time interval $T_{PUCCH}$ on the basis of the time correlation value of the PUCCH reference signal received at the time interval $T_{PUCCH}$. The deviation estimating unit 60 outputs to the wide-range deviation estimating device 56 the estimated phase difference as the observation value $\phi_{PUCCH}$ of the phase difference of the PUCCH reference signal at the time interval $T_{PUCCH}$.

The compensating unit 61 compensates for the frequency deviation of PUCCH data in accordance with the estimation result of the frequency deviation of the reception signal estimated by the wide-range deviation estimating device 56 by the frequency deviation calculating method, which will be described later. The channel estimating unit 62 performs channel estimation on the basis of the PUCCH reference signal. The detecting unit 63 performs channel equalization of the PUCCH data in accordance with the estimation result of the channel estimated by the channel estimating unit 62, and performs demodulation processing for the data. The decoding unit 64 decodes the demodulated data and outputs the reception result of the PUCCH.

The PUSCH receiving device 55 includes a deviation estimating unit 65, a compensating unit 66, a channel estimating unit 67, a detecting unit 68, and a decoding unit 69. The deviation estimating unit 65 estimates the phase deviation of a PUSCH reference signal at the time interval $T_{PUSCH}$ on the basis of the time correlation value of the PUSCH reference signal received at the time interval $T_{PUSCH}$. The deviation estimating unit 65 outputs to the wide-range deviation estimating device 56 the estimated phase difference as the observation value $\phi_{PUSCH}$ of the phase difference of the PUSCH reference signal at the time interval $T_{PUSCH}$.

The compensating unit 66 compensates for the frequency deviation of PUSCH data in accordance with the estimation result of the frequency deviation of the reception signal estimated by the wide-range deviation estimating device 56 by the frequency deviation calculating method, which will be described later. The channel estimating unit 67 performs channel estimation on the basis of the PUSCH reference signal. The detecting unit 68 performs channel equalization of the PUSCH data in accordance with the estimation result of the channel estimated by the channel estimating unit 67, and performs demodulation processing for the data. The decoding unit 69 decodes the demodulated data and outputs the reception result of the PUSCH.

The wide-range deviation estimating device 56 performs processing for calculating a frequency deviation by the frequency deviation calculating method, which will be described later, on the basis of the observation values $\phi_{PUCCH}$ and $\phi_{PUSCH}$ of the phase differences at the reception intervals $T_{PUCCH}$ and $T_{PUSCH}$ of PUCCH and PUSCH reference signals estimated by the deviation estimating unit 60 and the deviation estimating unit 65. The wide-range deviation estimating device 56 may include the selecting device 2, the acquiring device 3, and the estimating device 4 in the frequency deviation estimation functional block illustrated in FIG. 1, for example.

Figure 12:
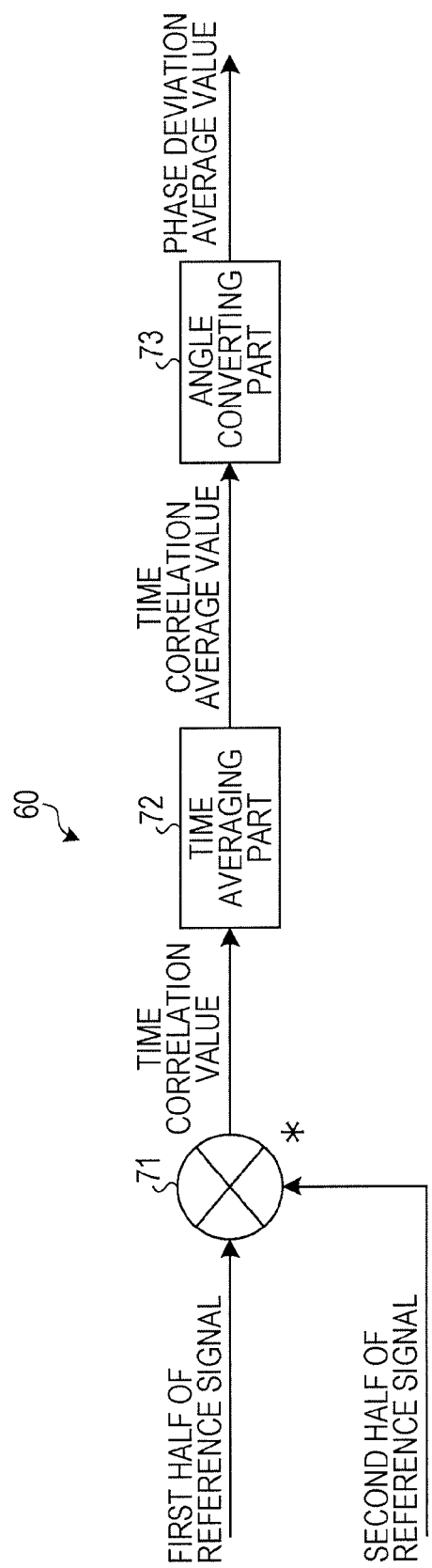
FIG. 12 illustrates an example of a deviation estimating unit in the receiving apparatus according to the third embodiment.

FIG. 12 illustrates an example of the deviation estimating units 60 and 65 in the receiving apparatus according to the third embodiment. As illustrated in FIG. 12, the deviation estimating unit 60 includes a multiplying part 71, a time averaging part 72, and an angle converting part 73. The multiplying part 71 performs complex multiplication for two PUCCH reference signals (the first half of the reference signal and the second half of the reference signal) received at the time interval $T_{PUCCH}$ to obtain time correlation value of the individual reference signals.

The time averaging part 72 averages the time correlation values obtained by the multiplying part 71 for a specific period of time to obtain the time correlation average value. The angle converting part 73 converts the time correlation value averaged by the time averaging part 72 into the average value of phase deviation. The estimate value (observation value $\phi_{PUCCH}$) of the phase difference of the PUCCH reference signal at the reception interval $T_{PUCCH}$ obtained as described above is supplied to the wide-range deviation estimating device 56.

The deviation estimating unit 65 has a configuration similar to the deviation estimating unit 60 illustrated in FIG. 12. For the deviation estimating unit 65, "PUCCH", "$T_{PUCCH}$", and "$\phi_{PUCCH}$" in the explanation of the deviation estimating unit 60 provided above are replaced with "PUSCH", "$T_{PUSCH}$", and "$\phi_{PUSCH}$", respectively.

Figure 13:
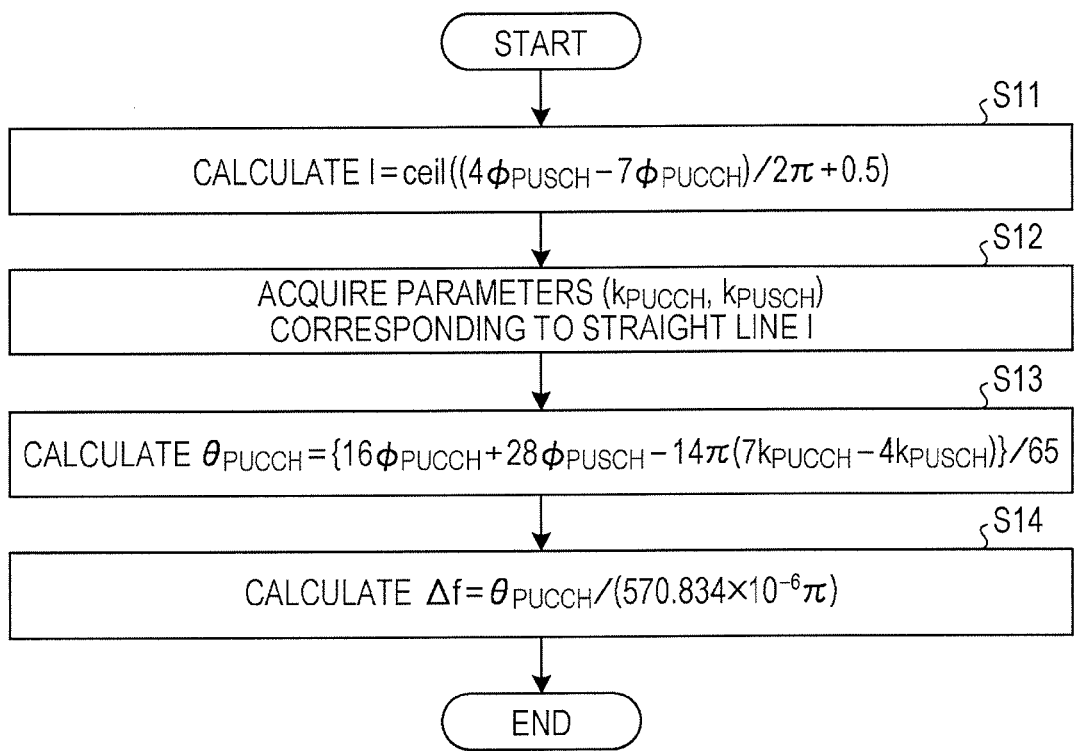
FIG. 13 illustrates an example of a frequency deviation calculating method according to the third embodiment.

FIG. 13 illustrates an example of a frequency deviation calculating method according to the third embodiment. As illustrated in FIG. 13, when frequency deviation calculating processing starts in the receiving circuit 50, the deviation estimating unit 60 calculates the estimate value (observation value $\phi_{PUCCH}$) of the phase difference of a PUCCH reference signal at the reception interval $T_{PUCCH}$. The deviation estimating unit 65 also calculates the estimate value (observation value $\phi_{PUSCH}$) of the phase difference of a PUSCH reference signal at the reception interval $T_{PUCCH}$.

The wide-range deviation estimating device 56 performs calculation using equation (21) (operation 11). Accordingly, the number "l" of the straight line that is the closest to the coordinate point represented by the observation values $\phi_{PUCCH}$ and $\phi_{PUSCH}$ of the phase differences of the PUCCH and PUSCH reference signals is obtained. Equation (21) utilizing a floor function, is obtained by substituting 4 for $S_0$ and substituting 7 for $S_1$ in equation (11).

$$l = \left\lfloor \frac{4\phi_{PUSCH} - 7\phi_{PUCCH}}{2\pi} + 0.5 \right\rfloor \quad (21)$$

Then, the wide-range deviation estimating device 56 acquires parameters $k_{PUCCH}$ and $k_{PUSCH}$ corresponding to the straight line having the number "l" obtained in operation 11, for example, from the table 26 illustrated in FIG. 8 (operation 12). Then, the wide-range deviation estimating device 56 performs calculation using equation (22) (operation 13). Accordingly, the true phase rotation $\theta_{PUCCH}$ of the PUCCH reference signal at the reception interval $T_{PUCCH}$ is obtained. Equation (22) is obtained by substituting 4 for $S_0$ and substituting 7 for $S_1$ in equation (18)

$$\theta_{PUCCH} = \frac{16\phi_{PUCCH} + 28\phi_{PUSCH} - 14\pi(7k_{PUCCH} - 4k_{PUSCH})}{65} \quad (22)$$

By calculation using equation obtained by substituting 4 and 7 for $S_0$ and $S_1$, respectively, in equation (19), the true phase rotation $\theta_{PUSCH}$ of the PUSCH reference signal at the reception interval $T_{PUSCH}$ may be obtained. Furthermore, $\theta_{PUSCH}$ may be obtained by calculation using equation (23).

$$\theta_{PUSCH} = \frac{S_{PUSCH}\theta_{PUCCH}}{S_{PUCCH}} \quad (23)$$

Then, the wide-range deviation estimating device 56 performs calculation using equation (24) (operation 14). Accordingly, the frequency deviation $\Delta f$ of a reception signal is obtained. Equation (24) is obtained by substituting $285.417\times10^{-6}$ for $T_0$ in equation (20). The frequency deviation $\Delta f$ may be obtained by calculation using an equation obtained by substituting $500\times10^{-6}$ for $T_1$ in equation (20). The frequency deviation $\Delta f$ is obtained as described above, and a series of processing operations is terminated.

$$\Delta f = \frac{\theta_{PUCCH}}{570.834\times 10^{-6}\pi} \quad (24)$$

In the third embodiment, in the explanation provided above, a possible frequency range for estimation of the frequency deviation $\Delta f$ is between −7000 Hz and 7000 Hz, for example. The possible frequency range for estimation of the frequency deviation $\Delta f$ may be restricted. For example, an example in which the possible frequency range for estimation of the frequency deviation $\Delta f$ is restricted to a range between −3000 Hz and 3000 Hz will be illustrated.

Figure 14:
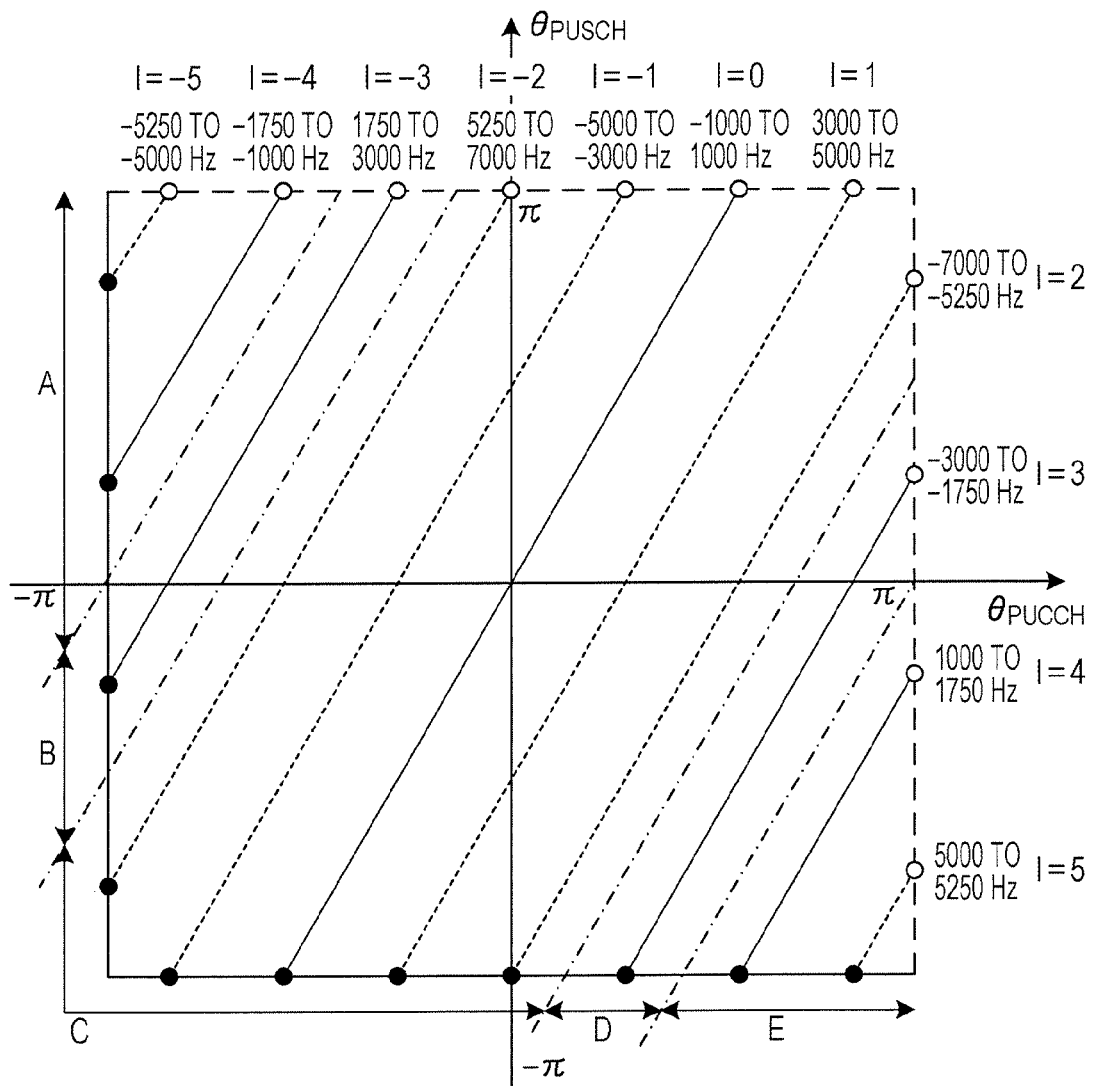
FIG. 14 illustrates another example of a solution space representing combinations of $\theta_{PUCCH}$ and $\theta_{PUSCH}$ in the third embodiment.

FIG. 14 illustrates another example of a solution space representing combinations of $\theta_{PUCCH}$ and $\theta_{PUSCH}$ in the third embodiment. In the example illustrated in FIG. 14, for selection of the straight line that is the closest to the coordinate point ($\phi_{PUCCH}$, $\phi_{PUSCH}$), a straight line whose number is "1" or "−1", a straight line whose number is "2" or "−2", and a straight line whose number is "5" or "−5", which are expressed by broken lines, are not to be selected. That is, the straight line that is the closest to the coordinate point ($\phi_{PUCCH}$, $\phi_{PUSCH}$) is selected from five straight lines, that is, a straight line whose number is "0", straight lines whose numbers are "3" and "−3", and straight lines whose numbers are "4" and "−4".

Furthermore, normally, the ratio of users whose frequency deviation is large is smaller than the ratio of users whose frequency deviation is small. Thus, the solution space illustrated in FIG. 14 may be divided into regions A, B, C, D, and E using alternate long and short dashed lines, and a straight line may be selected in accordance with a region where the coordinate point ($\phi_{PUCCH}$, $\phi_{PUSCH}$) exists.

For example, a region on the side of the straight line whose number "l" is "−5" than the middle between the straight line whose number "l" is "−4" and the straight line whose number "l" is "−3" may be defined as the region A. In the case where the coordinate point ($\phi_{PUCCH}$, $\phi_{PUSCH}$) exists in the region A, the wide-range deviation estimating device 56 may select the straight line whose number "l" is "−4" as the straight line that is the closest to the coordinate point ($\phi_{PUCCH}$, $\phi_{PUSCH}$).

For example, a region from the middle between the straight line whose number "l" is "−4" and the straight line whose number "l" is "−3" to the middle between the straight line whose number "l" is "−3" and the straight line whose number "l" is "−2" may be defined as the region B. In the case where the coordinate point ($\phi_{PUCCH}$, $\phi_{PUSCH}$) exists in the region B, the wide-range deviation estimating device 56 may select the straight line whose number "l" is "−3" as the straight line that is the closest to the coordinate point ($\phi_{PUCCH}$, $\phi_{PUSCH}$).

Furthermore, for example, a region from the middle between the straight line whose number "l" is "−3" and the straight line whose number "l" is "−2" to the middle between the straight line whose number "l" is "2" and the straight line whose number "l" is "3" may be defined as the region C. In the case where the coordinate point ($\phi_{PUCCH}$, $\phi_{PUSCH}$) exists in the region C, the wide-range deviation estimating device 56 may select the straight line whose number "l" is "0" as the straight line that is the closest to the coordinate point ($\phi_{PUCCH}$, $\phi_{PUSCH}$).

Furthermore, for example, a region from the middle between the straight line whose number "l" is "2" and the straight line whose number "l" is "3" to the middle between the straight line whose number "l" is "3" and the straight line whose number "l" is "4" may be defined as the region D. In the case where the coordinate point ($\phi_{PUCCH}$, $\phi_{PUSCH}$) exists in the region D, the wide-range deviation estimating device 56 may select the straight line whose number "l" is "3" as the straight line that is the closest to the coordinate point ($\phi_{PUCCH}$, $\phi_{PUSCH}$).

Furthermore, for example, a region on a side of the straight line whose number "l" is "5" than the middle between the straight line whose number "l" is "3" and the straight line whose number "l" is "4" may be defined as the region E. In the case where the coordinate point ($\phi_{PUCCH}$, $\phi_{PUSCH}$) exists in the region E, the wide-range deviation estimating device 56 may select the straight line whose number "l" is "4" as the straight line that is the closest to the coordinate point ($\phi_{PUCCH}$, $\phi_{PUSCH}$).

FIG. 15 illustrates another example of the correspondence of the number "l" of a straight line to parameters $k_{PUCCH}$ and $k_{PUSCH}$ in the third embodiment. A table 27 illustrated in FIG. 15 represents combinations of the parameters $k_{PUCCH}$ and $k_{PUSCH}$ realizing the solution space illustrated in FIG. 14.

As illustrated in FIG. 15, for example, in the case where the number "l" is "−5", the parameters $k_{PUCCH}$ and $k_{PUSCH}$ are 0 and −1, respectively, which are the same as the case where the number "l" is "−4". Thus, even in the case where the straight line whose number "l" is "−5" is the closest to the coordinate point ($\phi_{PUCCH}$, $\phi_{PUSCH}$), the straight line whose number "l is −4" is selected.

Furthermore, in the case where the number "l" is "−2", "−1", "1", and "2", the parameters $k_{PUCCH}$ and $k_{PUSCH}$ are 0, which is the same as the case where the number "l" is "0". Thus, even in the case where the straight line whose number "l" is "−2", "−1", "1", or "2" is the closest to the coordinate point ($\phi_{PUCCH}$, $\phi_{PUSCH}$), the straight line whose number "l" is 0 is selected. The same applies to the case where the number "l" is "5".

As in the example of the solution space illustrated in FIG. 14, by narrowing the estimate range of frequency deviation, noise-resistant estimation is achieved.

In a fourth embodiment, the receiving apparatus according to the first embodiment is applied to, for example, base station equipment in an LTE system. For example, a case where a first channel is defined as PUCCH, which is an uplink control signal, and a second channel is defined as a PUSCH, which is an uplink data signal, will be illustrated. In this case, that is, in the fourth embodiment, orthogonal projection with respect to the straight line that is the closest to the coordinate point ($\phi_0$, $\phi_1$) is not performed from the coordinate point ($\phi_0$, $\phi_1$) in the third embodiment. Explanations overlapping the first embodiment or the third embodiment will be omitted.

Figure 16:
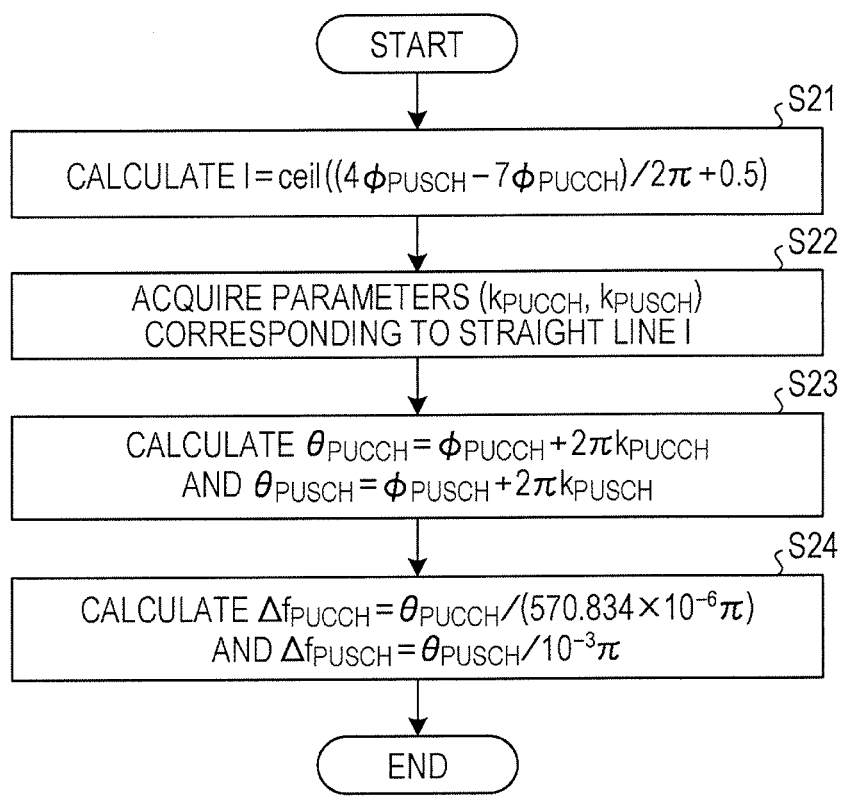
FIG. 16 illustrates an example of a frequency deviation calculating method according to a fourth embodiment.

FIG. 16 illustrates an example of a frequency deviation calculating method according to the fourth embodiment. As illustrated in FIG. 16, processing to calculation using equation (21) (operation 21) and acquisition of parameters $k_{PUCCH}$ and $k_{PUSCH}$ (operation 22) is performed similarly to operation 11 and operation 12 in the flowchart illustrated in FIG. 13.

Then, the wide-range deviation estimating device 56 performs calculation using equation (25) and equation (26) (operation 23). Accordingly, the phase rotation $\theta_{PUCCH}$ of a PUCCH reference signal at the reception interval $T_{PUCCH}$ and the phase rotation $\theta_{PUSCH}$ of a PUSCH reference signal at the reception interval $T_{PUSCH}$ are obtained.

$$\theta_{PUCCH} = \phi_{PUCCH} + 2\pi k_{PUCCH} \tag{25}$$

$$\theta_{PUSCH} = \phi_{PUSCH} + 2\pi k_{PUSCH} \tag{26}$$

Then, the wide-range deviation estimating device 56 performs calculation using equation (27) and equation (28) (operation 24). Accordingly, the frequency deviation $\Delta f_{PUCCH}$ of the PUCCH reception signal and the frequency deviation $\Delta f_{PUSCH}$ of the PUSCH reception signal are obtained. Equation (27) is obtained by substituting $285.417 \times 10^{-6}$ for $T_0$ in equation (15). Equation (28) is obtained by substituting $500 \times 10^{-6}$ for $T_1$ in equation (16). The frequency deviations $\Delta f_{PUCCH}$ and $\Delta f_{PUSCH}$ are obtained as described above, and a series of processing operations is terminated.

$$\Delta f_{PUCCH} = \frac{\theta_{PUCCH}}{570.834 \times 10^{-6}\pi} \tag{27}$$

$$\Delta f_{PUSCH} = \frac{\theta_{PUSCH}}{10^{-3}\pi} \tag{28}$$

In the third embodiment, by performing orthogonal projection for the straight line that is the closest to the coordinate point ($\phi_0$, $\phi_1$) from the coordinate point ($\phi_0$, $\phi_1$), $\theta_{PUCCH}$ and $\theta_{PUSCH}$ are derived from the same phase rotation speed. Thus, the frequency deviation $\Delta f_{PUCCH}$ is equal to the frequency deviation $\Delta f_{PUSCH}$. In contrast, in the fourth embodiment, since orthogonal projection is not performed, $\theta_{PUCCH}$ and $\theta_{PUSCH}$ do not be derived from the same phase rotation speed due to the influence of noise. Thus, the phase deviation $\Delta f_{PUCCH}$ do not be equal to the phase deviation $\Delta f_{PUSCH}$.

According to the fourth embodiment, since orthogonal projection is not performed, frequency deviation may be calculated with a reduced calculation amount. Thus, the deterioration in the throughput in estimation of the frequency deviation of a reception signal is avoided.

The embodiments described above may be applied to a receiving apparatus that receives a plurality of channels having different time intervals of reference signals for a single user as well as a receiving apparatus in an LTE system. Furthermore, in the deviation estimating units 60 and 65, the phase rotation of reception signals of individual channels may be estimated using, for example, cyclic prefix (also called "guard interval") used in an OFDM system or an orthogonal frequency division multiple access (OFDMA) system and other known signals, instead of using reference signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A receiving apparatus, comprising:
a memory that stores parameters corresponding to equally-spaced parallel lines forming a solution space derived based on a first time interval and a second time interval in a coordinate space in which first phase rotation at the first time interval of a first reference signal included in a reception signal of a first channel is defined as a first axis and second phase rotation at the second time interval of a second reference signal included in a reception signal of a second channel is defined as a second axis;
a selecting device that selects a line that is closest to a coordinate point in the solution space, the coordinate point being represented by a first observation value of the first phase rotation and a second observation value of the second phase rotation;
an acquiring device that acquires the parameters corresponding to the line selected by the selecting device from the memory; and
an estimating device that estimates, based on the parameters acquired by the acquiring device, the first observation value, and the first time interval or the parameters acquired by the acquiring device, the second observation value, and the second time interval, frequency deviations of the reception signals.
2. The receiving apparatus according to claim 1, wherein the estimating device specifies a point on the selected line corresponding to the coordinate point by performing orthogonal projection with respect to the selected line from the coordinate point, and estimates the frequency deviations of the reception signals by defining coordinates of the specified point as the first phase rotation and the second phase rotation.

3. The receiving apparatus according to claim 1, wherein the estimating device defines a line corresponding to a frequency deviation smaller than a threshold of the lines included in the solution space as a line to be selected and defines a line corresponding to a frequency deviation greater than the threshold of the lines included in the solution space as a line not to be selected.

4. The receiving apparatus according to claim 1, wherein the receiving apparatus is provided in base station equipment.

5. The receiving apparatus according to claim 4, wherein the reception signal of the first channel is an uplink control signal received by the base station equipment, and the reception signal of the second channel is an uplink data signal received by the base station equipment.

6. A frequency deviation calculating method, comprising:
selecting a line that is closest to a coordinate point in a solution space formed of equally-spaced parallel lines derived based on a first time interval and a second time interval in a coordinate space in which first phase rotation at the first time interval of a first reference signal included in a reception signal of a first channel is defined as a first axis and second phase rotation at the second time interval of a second reference signal included in a reception signal of a second channel is defined as a second axis, the coordinate point being represented by a first observation value of the first phase rotation and a second observation value of the second phase rotation;
acquiring parameters corresponding to the selected line from parameters corresponding to the individual lines in the solution space; and
estimating, based on the acquired parameters, the first observation value, and the first time interval or the acquired parameters, the second observation value, and the second time interval, frequency deviations of the reception signals.

7. The frequency deviation calculating method according to claim 6,
wherein a point on the selected line corresponding to the coordinate point is specified by performing orthogonal projection with respect to the selected line from the coordinate point, and
wherein the frequency deviations of the reception signals are estimated by defining coordinates of the specified point as the first phase rotation and the second phase rotation.

8. A computer-readable recording medium having stored therein a program for causing a computer to execute a frequency deviation calculating process, the process comprising:
selecting a line that is closest to a coordinate point in a solution space formed of equally-spaced parallel lines derived based on a first time interval and a second time interval in a coordinate space in which first phase rotation at the first time interval of a first reference signal included in a reception signal of a first channel is defined as a first axis and second phase rotation at the second time interval of a second reference signal included in a reception signal of a second channel is defined as a second axis, the coordinate point being represented by a first observation value of the first phase rotation and a second observation value of the second phase rotation;
acquiring parameters corresponding to the selected line from parameters corresponding to the individual lines in the solution space; and
estimating, based on the acquired parameters, the first observation value, and the first time interval or the acquired parameters, the second observation value, and the second time interval, frequency deviations of the reception signals.

9. The computer-readable recording medium according to claim 8,
wherein a point on the selected line corresponding to the coordinate point is specified by performing orthogonal projection with respect to the selected line from the coordinate point, and
wherein the frequency deviations of the reception signals are estimated by defining coordinates of the specified point as the first phase rotation and the second phase rotation.

* * * * *